United States Patent
Jalluri et al.

(10) Patent No.: US 10,684,607 B2
(45) Date of Patent: Jun. 16, 2020

(54) SYSTEM AND METHOD FOR PERFORMING A SPINDLE RUNOUT DIAGNOSTIC

(71) Applicant: Ford Motor Company, Dearborn, MI (US)

(72) Inventors: Chandra Jalluri, Canton, MI (US); Himanshu Rajoria, Canton, MI (US); David Paul Low, Amherstburg (CA); Steven Allen Clinansmith, Almont, MI (US); Craig Felt, Memphis, MI (US)

(73) Assignee: Ford Motor Company, Dearborn, MI (US)

( * ) Notice: Subject to any disclaimer, the term of this patent is extended or adjusted under 35 U.S.C. 154(b) by 97 days.

(21) Appl. No.: 15/946,321

(22) Filed: Apr. 5, 2018

(65) Prior Publication Data

US 2019/0310605 A1 Oct. 10, 2019

(51) Int. Cl.
*G05B 19/406* (2006.01)

(52) U.S. Cl.
CPC .. *G05B 19/406* (2013.01); *G05B 2219/32356* (2013.01); *G05B 2219/34048* (2013.01); *G05B 2219/49108* (2013.01)

(58) Field of Classification Search
CPC ........ G05B 19/406; G05B 2219/32356; G05B 2219/34048; G05B 2219/49108
See application file for complete search history.

(56) References Cited

U.S. PATENT DOCUMENTS

| 5,964,022 A | 10/1999 | Mann et al. |
| 6,604,013 B1* | 8/2003 | Hamidieh .......... G05B 19/4065 |
| | | 700/174 |
| 2018/0354088 A1* | 12/2018 | Matsushita ............ B23Q 15/12 |

FOREIGN PATENT DOCUMENTS

| CN | 102426001 | 4/2012 |
| KR | 20050100451 | 10/2005 |
| WO | 2009/114203 | 9/2009 |

OTHER PUBLICATIONS

Koepfer, C., Don't Touch That Tool, Modern Machine Shop post available at URL https://www.mmsonline.com/articles/don39t-touch-that-tool.

* cited by examiner

Primary Examiner — Chun Cao
(74) Attorney, Agent, or Firm — Burris Law, PLLC

(57) ABSTRACT

The present disclosure is directed toward a diagnostic method for a spindle arm of a machine. The method includes rotating the spindle arm of the machine at a first rotational speed, and acquiring, from an accelerometer, data indicative of a vibrational response of the spindle arm operating at the first rotational speed. The accelerometer is disposed along the spindle arm. The method further includes converting the vibrational response to a frequency based response to obtain a first frequency response, determining whether an amplitude of the first frequency response exceeds a diagnostic threshold, and performing a designated correction on the machine in response to the frequency response exceeding the diagnostic threshold.

17 Claims, 5 Drawing Sheets

SYSTEM AND METHOD FOR PERFORMING A SPINDLE RUNOUT DIAGNOSTIC

FIELD

The present invention relates to computer numerical control (CNC) machining equipment, and more particularly to performing diagnostics related to spindle runout.

BACKGROUND

The statements in this section merely provide background information related to the present disclosure and may not constitute prior art.

In automated CNC equipment, a spindle includes a shaft and a number of features to hold a cutting/processing tool, including by way of example clamping jaws and bolts that are actuated by a pull rod. In this type of CNC equipment, "runout" is a condition that occurs when the cutting/processing tool is not within alignment tolerances of the shaft and longitudinal axis of the spindle. When the cutting/processing tool is not in proper alignment, features created in a workpiece, such as a bore diameter created with a cutting tool having a nominal diameter, are out of tolerance and larger than the nominal diameter of the cutting tool.

In large-scale production environments, dozens of spindles are in operation throughout multiple shifts. When spindle runout is out of tolerance, parts being machined experience larger tolerances and reduced quality. Further, when runout is unacceptable, the CNC machines experience downtime while the spindle arbor is being calibrated. These spindle runout issues, among other CNC equipment issues, are addressed by the present disclosure.

SUMMARY

This section provides a general summary of the disclosure, and is not a comprehensive disclosure of its full scope or all of its features.

In one form, the present disclosure is directed toward a diagnostic method for a spindle arm of a machine. The method includes: rotating the spindle arm of the machine at a first rotational speed; acquiring, from an accelerometer, data indicative of a vibrational response of the spindle arm operating at the first rotational speed, where the accelerometer is disposed along the spindle arm; converting, by a diagnostic controller, the vibrational response to a frequency based response to obtain a first frequency response; determining, by the diagnostic controller, whether an amplitude of the first frequency response exceeds a diagnostic threshold; and performing a designated correction on the machine in response to the frequency response exceeding the diagnostic threshold.

In another form, the method further includes filtering, by the diagnostic controller, the data indicative of the vibrational response about the first rotational speed prior to converting the vibrational response.

In yet another form, the filtering the data is performed with a bandpass filter.

In one form, the method further includes transmitting, by the diagnostic controller, a runout query to assess whether a spindle runout correction was performed; acquiring, by the diagnostic controller, a response input to the runout query; transmitting, by the diagnostic controller, a runout correction notification to initiate a spindle runout correction as the designated correction in response to the spindle runout correction not being previously performed; and transmitting, by the diagnostic controller, a machine check notification as the designated correction in response to the spindle runout correction as being previously performed.

In another form, the vibrational response is converted to a frequency based response using fast Fourier transform.

In yet another form, the method further includes orientating the spindle arm at a test position associated with the diagnostic threshold prior to rotating the spindle arm.

In one form, in response to the amplitude of the first frequency response exceeding the diagnostic threshold, the method further includes rotating the spindle arm at a second rotational speed different from the first rotational speed; acquiring, from the accelerometer, data indicative of the vibrational response of the spindle arm operating at the second rotational speed; converting, by the diagnostic controller, the vibrational response at the second rotational speed to a frequency based response to obtain a second frequency response; determining, by the diagnostic controller, whether an amplitude of the second frequency response exceeds the diagnostic threshold; transmitting, by the diagnostic controller, a runout correction notification in response to the amplitude of the second frequency response exceeding the diagnostic threshold; and transmitting, by the diagnostic controller, a machine check notification, as the designated response, in response to the amplitude of the second frequency response being below the diagnostic threshold.

In another form, the method further includes transmitting, by the diagnostic controller, a runout correction notification in response to the amplitude of the second frequency response exceeding the diagnostic threshold; and transmitting, by the diagnostic controller, a machine check notification to initiate a system check of the machine as the designated response in response to the amplitude of the frequency based response being below the diagnostic threshold.

In one form, the present disclosure is directed toward, a diagnostic system for a spindle arm of a machine. The system includes an accelerometer operable to acquire a vibrational response of the spindle arm, and a diagnostic controller configured to acquire the vibrational response from the accelerometer with the spindle arm rotating at a first rotational speed, and to diagnosis the machine based on a fast Fourier analysis of the vibration response acquired.

In another form, the diagnostic controller is configured to filter the data from the accelerometer, convert the filtered data to a frequency based response to obtain a first frequency response using the fast Fourier analysis, and compare an amplitude of the first frequency response with a diagnostic threshold.

In yet another form, the diagnostic controller is configured to diagnose a spindle runout and transmit a runout correction notification in response to the amplitude of the first frequency response exceeding the diagnostic threshold, and to diagnose a system check and transmit a machine check notification in response to the amplitude of the frequency based response being below the diagnostic threshold.

In one form, in response to the amplitude exceeding the diagnostic threshold, the diagnostic controller is configured to transmit a runout query to determine whether a spindle runout correction was performed, and to receive a query response input indicating whether the spindle runout correction was performed. The diagnostic controller is further configured to generate and transmit a runout correction notification to initiate a spindle runout correction in response to the query response input indicating that the spindle runout correction was not previously performed, and to generate and transmit a machine check notification in response to the query response input indicating that the spindle runout correction was previously performed.

In another form, the accelerometer is attachable to and detachable from the spindle arm.

In yet another form, the accelerometer is fixedly attached to the spindle arm.

In one form, the diagnostic controller includes a programmable logic machine controller.

In one form, the present disclosure is directed toward a diagnostic method that includes rotating a spindle arm of a machine at a set speed; measuring a vibrational response of the spindle arm rotating at the set speed with an accelerometer; filtering data from the accelerometer about the set speed; converting the filtered data to a frequency response using fast Fourier transform; and transmitting a service notification regarding the machine based on whether an amplitude of the frequency response exceeds a diagnostic threshold.

In another form, in response to the amplitude of the frequency response exceeding the diagnostic threshold, the method further includes transmitting a runout query to assess whether a spindle runout correction was performed; acquiring information indicative of whether the spindle runout correction was performed; transmitting a runout correction notification, as the service notification, to initiate a spindle runout correction in response to the spindle runout correction not being previously performed; and transmitting a machine check notification, as the service notification, in response to the spindle runout correction as being previously performed.

In yet another form, the service notification is a runout correction notification in response to the amplitude of the frequency response exceeding the diagnostic threshold, and is a machine check notification to initiate a system check of the machine in response to the amplitude of the frequency based response being below the diagnostic threshold.

In one form, the filtering the data is performed with a bandpass filter.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
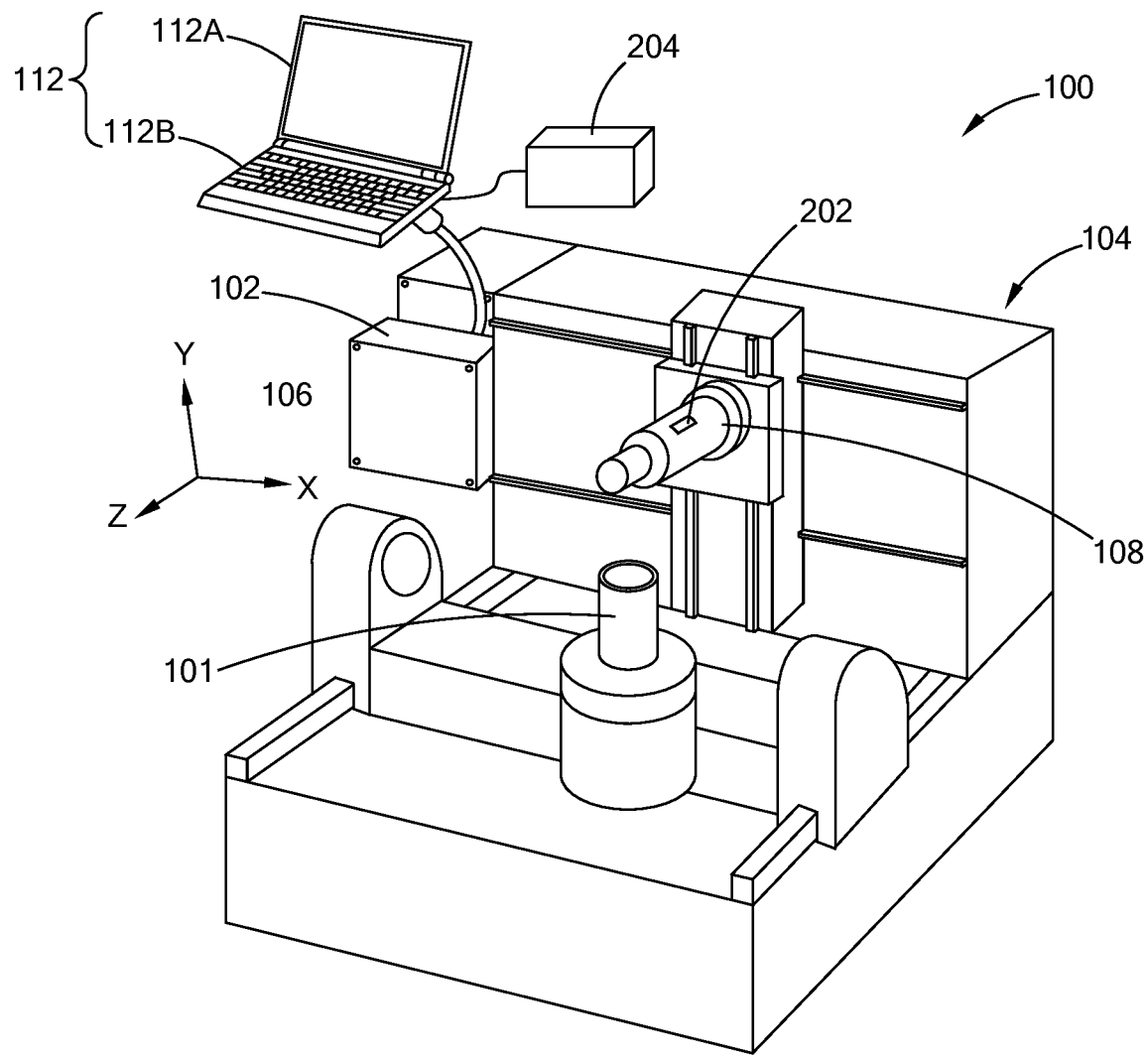
FIG. 1 illustrates a computer numerical control system having a machine diagnostic system in accordance with the teaching of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Anomalies in metal cutting process originating from, for example, upstream process, machine degradation, or tool setup, can induce runout in a CNC spindle. While there are various means for addressing spindle runout, there are limited automated tools available for diagnosing spindle runout, and even verifying the runout correction addressed the performance issue. The present disclosure is directed toward a machine diagnostic system and a diagnostic method for diagnosing spindle runout or other machine component issue.

Referring to FIG. 1, a computer numerical control (CNC) machine system 100 is operable to form complex parts, such as gear sets, torque converters, etc, from a workpiece 101. In addition to other components, the CNC system 100 includes a machine controller 102 and a multi-axis CNC machining center 104 ("CNC machine" hereinafter) that is controlled by the machine controller 102 to form a part (e.g., an engine block) out of a workpiece (e.g., metal casting). The CNC machine 106 includes a spindle arm (i.e., spindle) 108 that is configured to hold and rotate a tool attached to an end of the spindle 108. The spindle 108 and/or the workpiece 101 are moveable relative to each other along multiple axes, such that the spindle 108 aligns with a section of the workpiece 101 that is to be machined. The teachings of the present disclosure are applicable to other machines, and should not be limited to the CNC system 100 depicted.

In one form, the machine controller 102 is a computing device that includes one or more processors and memory for storing computer readable instructions executed by the processors. The machine controller 102 is configured to operate the CNC machine 104 using one or more pre-stored programs executed by the processor. For example, along with other components of the CNC machine 104, the machine controller 102 controls the torque, position, orientation, and other operation parameters of the spindle 108 in order to form the part. In one form, the machine controller 102 is accessible by an operator via a user interface 112 that includes a monitor 112A and a keyboard 112B. Other user interfaces 112 may also be used while being within the scope of the present disclosure.

Figure 2:
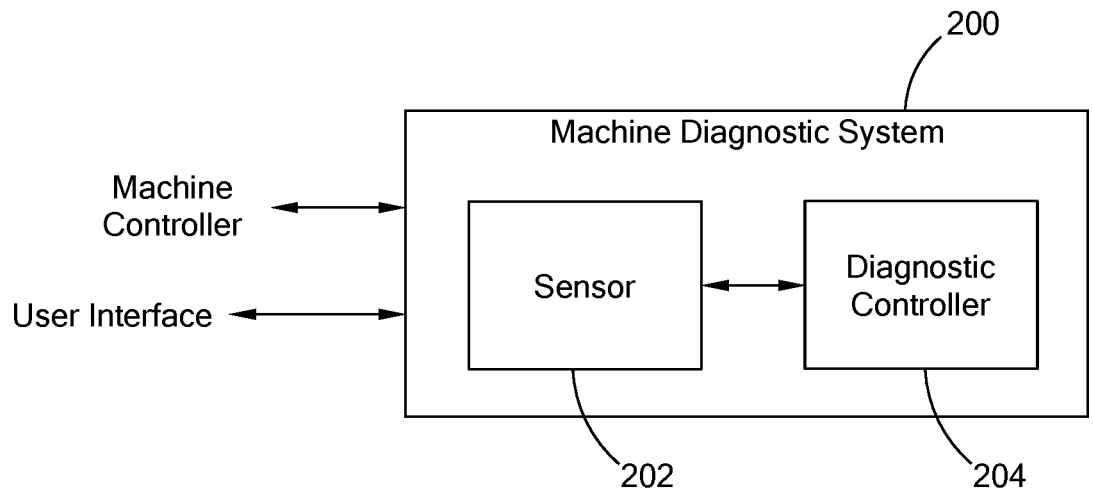
FIG. 2 is a block diagram of the machine diagnostic system in accordance with the teachings of the present disclosure.

Referring to FIG. 2, a machine diagnostic system 200 of the present disclosure is configured to perform a spindle runout diagnostic to check for possible spindle runout condition, and to address other possible conditions that can affect the performance of the spindle 108 but may not be a runout. More particularly, a vibrational response of the CNC machine 104 may be affected by other components of the CNC machine 104 and may not necessarily be a misalignment of the spindle 108. For example, machine resonance, looseness related to assembly internal to the spindle or spindle mounting integrity, etc. Accordingly, if the vibrational response remains out of specification after a runout correction procedure is performed, the machine diagnostic system 200 determines that the cause is not a spindle runout, but another component of the CNC machine 104 and thus, a machine health check is to be performed.

The machine diagnostic system 200 includes a sensor 202 and a diagnostic controller 204. In one form, the sensor 202 is an accelerometer that measures dynamic energy (i.e., acceleration) along one or more axes, and is mounted on the spindle 108. The sensor 202 may be an accelerometer already disposed at the spindle 108 or alternatively is a separate sensor that can be attached to and detached from the spindle 108. The sensor 202 transmits data indicative of the dynamic energy (i.e., a vibrational response) of the spindle 108 as a vibrational response signal to the diagnostic controller 204. In one form, the vibration response signal is a time-domain based signal, and is transmitted via wireless and/or wired communication link to the diagnostic controller 204.

In one form, the vibrational response of the spindle 108 is measured with the spindle 108 set at a predefined test position (e.g., 0,0,0 position or home position), and with the spindle rotating at a diagnostic speed (i.e., a set speed). The spindle 108 is generally operable within a set range, such as 0-8,000 rotation-per-minute (rpm) or 0-20,000 rpm, and the diagnostic speed is a set speed (e.g. 6000 rpm, 6500 rpm, or other suitable value) that is within the set range. The diagnostic speed and the test position of the spindle 108 are predetermined and coincide with the diagnostic speed and test position used to establish a diagnostic threshold. The vibrational response of the spindle 108 is measured for a predetermined time, such as 10-seconds, 20-second, or other suitable time for obtaining sufficient data set for analysis. In addition, in one form, the end of the spindle 108 may be free of a longitudinal tool, and may include a plug device to close the end of the spindle 108.

In one form, the diagnostic controller 204 is a computing device that includes a processor and a memory for storing computer readable instructions executed by the processor. The diagnostic controller 204 is communicably coupled to the machine controller 102 by way of the user interface 112 (FIG. 1). While the diagnostic controller 204 is provided as a separate unit outside of the CNC system 100, the diagnostic controller 204 may be configured as part of the machine controller 102 to perform the diagnostic checks described herein.

In one form, the diagnostic controller 204 is configured to acquire the data indicative of the vibrational response of the spindle 108 from the sensor 202. The data may also be referred to as a vibrational response signal. The diagnostic controller 204 is configured to process the raw data from the sensor 202 to obtain a frequency based response signal about the diagnostic speed. Specifically, in one form, the diagnostic controller 204 filters the data from the sensor 202 about the diagnostic speed using a bandpass filter. For example, the diagnostic controller 204 filters the data to include measurements at the diagnostic speed±a boundary limit (e.g., 6000±600 rpm, 6500±900 rpm). While specific examples of the diagnostic speed and boundary limit are provided, other values may also be used and are within the scope of the present disclosure.

Using the filtered data, the diagnostic controller 204 converts the vibrational response signal to a frequency based response. In one form, the diagnostic controller 204 is configured to convert the filtered data that is in time domain to the frequency domain using fast Fourier transform (FFT).

The diagnostic controller 204 compares the frequency response with a diagnostic threshold to determine whether the spindle is performing within an operating specification. In one form, the diagnostic threshold is a predetermined value indicative of an amplitude limit, and can be set using various suitable methods. For example, the diagnostic threshold may be based on an industry standard for machine run-off. In another example, the diagnostic threshold may be determined by collecting baseline data of multiple vibrational responses of a test spindle that is aligned, performing a standard deviation of the data, and determining an acceptable amplitude threshold for an aligned spindle. The diagnostic threshold depends on the application, the machine, and the type of spindle being used, and thus, may vary.

Based on the diagnostic threshold, if an amplitude of the frequency response is less than or equal to the diagnostic threshold, the diagnostic controller 204 determines the spindle 108 is performing within the operating specification. In one form, the diagnostic controller 204 transmits a completion notification to the user interface 112 to display a message via the monitor. The completion notification indicates that the spindle 108 is operating accurately and that the diagnostic is complete. In another form, the completion notification may further request that a machine system check be performed to check the overall performance of the system 100. For example, in one form, a system check may include running spindle at one or more fixed idle speeds and measuring the vibration response to an industrial standard.

Figure 3:
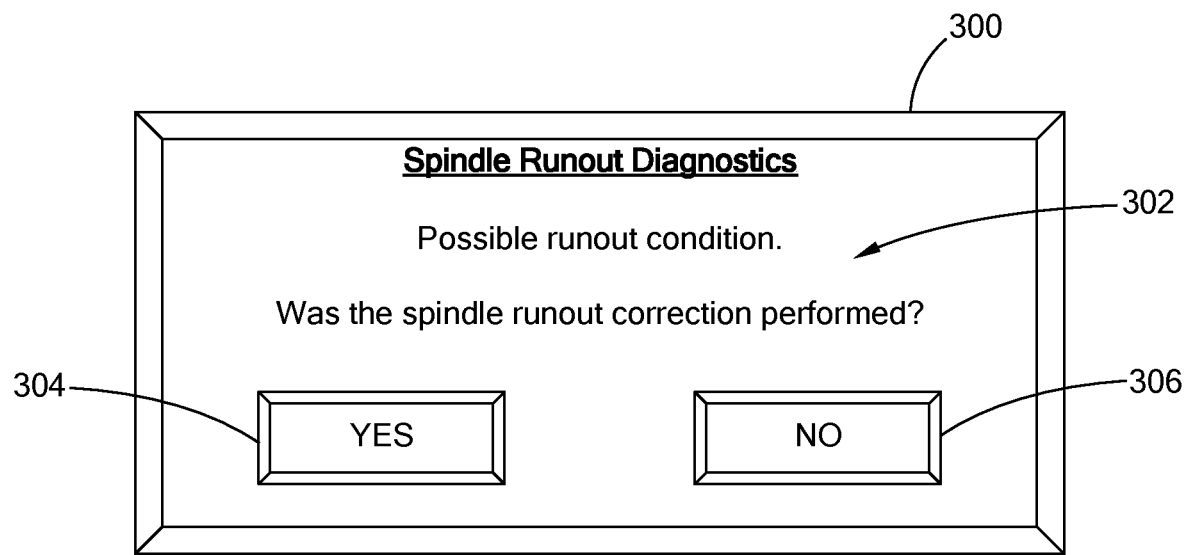
FIG. 3 is an example of a runout query notification in accordance with the teachings of the present disclosure.
Figure 4:
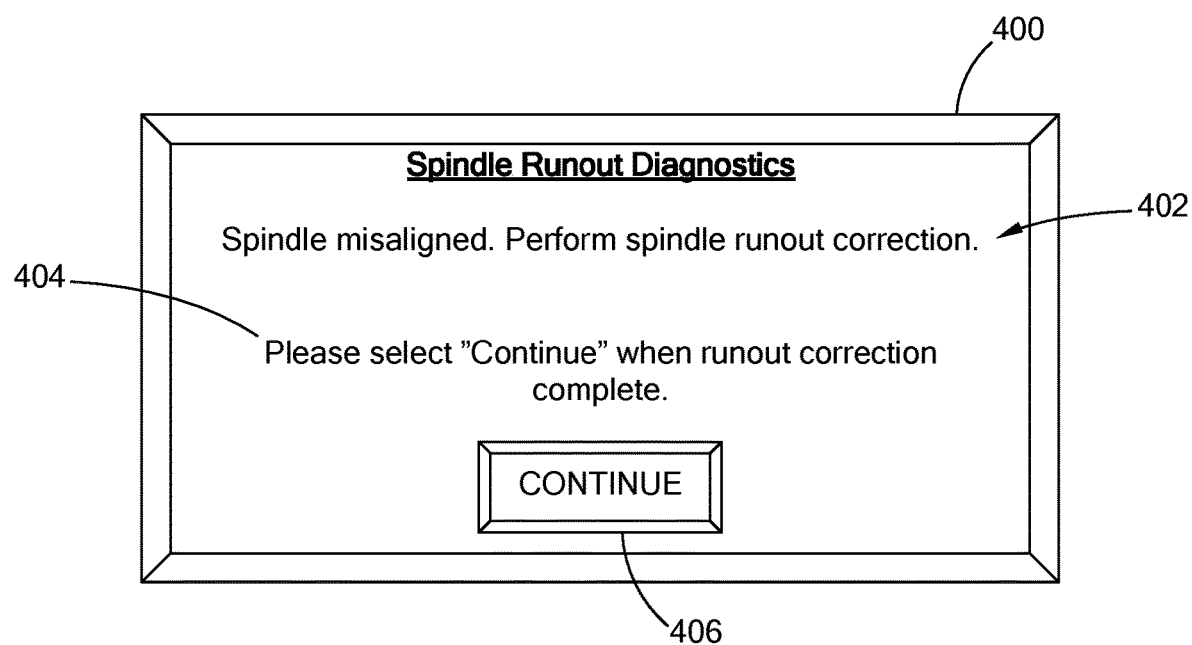
FIG. 4 is an example of a runout correction notification in accordance with the teachings of the present disclosure.

If an amplitude of the frequency response is greater than the diagnostic threshold, the diagnostic controller 204 is configured to transmit a runout query notification to the user interface 112 to assess whether a spindle runout correction was performed. Referring to FIG. 3, a runout query notification 300 may include a query 302 to be answered by an operator, and buttons 304 and 306 operable by the operator to respond to the query with "YES" or "NO", respectively. If the operator responds with the "NO" button 306, the diagnostic controller 202, transmits a runout correction notification to the user interface 112 to have a message informing the operator of a possible runout and instructing the operator to perform a runout correction. In one form, the runout correction notification also includes a completion query to assess whether the runout correction is complete. For example, FIG. 4 illustrates an example runout correction notification 400 that includes a message 402 that indicates that the spindle is misaligned and to perform the runout correction, a query 404 requesting information regarding completion of the correction, and a button 406 provided as "Continue" and operable by the operator when the runout correction is complete. Once complete, the diagnostic controller 204 performs the diagnostic again to confirm the spindle runout is addressed.

Various runout correction operations may be used to correct the misalignment of the spindle 108. For example, in one form, the spindle 108 may include a spindle nut having a plurality of adjustment members that are operable to adjust a runout of the shaft. An example of this spindle nut and a method for adjusting spindle runout is provided in co-pending application, U.S. Ser. No. 15/454,663, filed Mar. 9, 2017 and titled "ZERO RUNOUT NUT" which is commonly owned with the present application and the contents of which are incorporated herein by reference in its entirety.

If the operator responds with the "YES" button to the runout query notification, the diagnostic controller 204 transmits a machine check notification to the user interface 112 to instruct an operator to perform a general system check of the CNC machine 102. More particularly, once the spindle runout is addressed, it is likely that the irregular amplitude of the frequency response caused by another component(s) or portion of the CNC machine 102, and thus a health check is recommended. In one form, the diagnostic controller 204 is configured to end the spindle runout diagnostic after transmitting the machine check notification. In another form, the diagnostic controller 204 is configured to perform the diagnostic again and output a repair notification if another irregular amplitude is provided.

In one form, if the amplitude of the frequency response is greater than the diagnostic threshold, in lieu of transmitting the runout correction query, the diagnostic controller 204 is configured to evaluate the spindle 108 based on a second diagnostic speed. Specifically, to further verify the occurrence of a possible runout or other component error, the spindle 108 is rotated at a second diagnostic speed that is within the speed range of the spindle 108 but different from the first diagnostic speed. The vibrational response of the spindle 108 is measured and processed in a similar manner as the vibrational response at the first diagnostic speed. If the amplitude of the frequency response at the second diagnostic speed exceeds the diagnostic threshold, the diagnostic controller 204 is configured to output the runout correction query. If the amplitude is below the diagnostic threshold, the diagnostic controller 204 is configured to transmit a completion notification to the user interface 112 to display a message via the monitor or further request that a machine system check be performed to check the overall performance of the system 100.

Figure 5A:
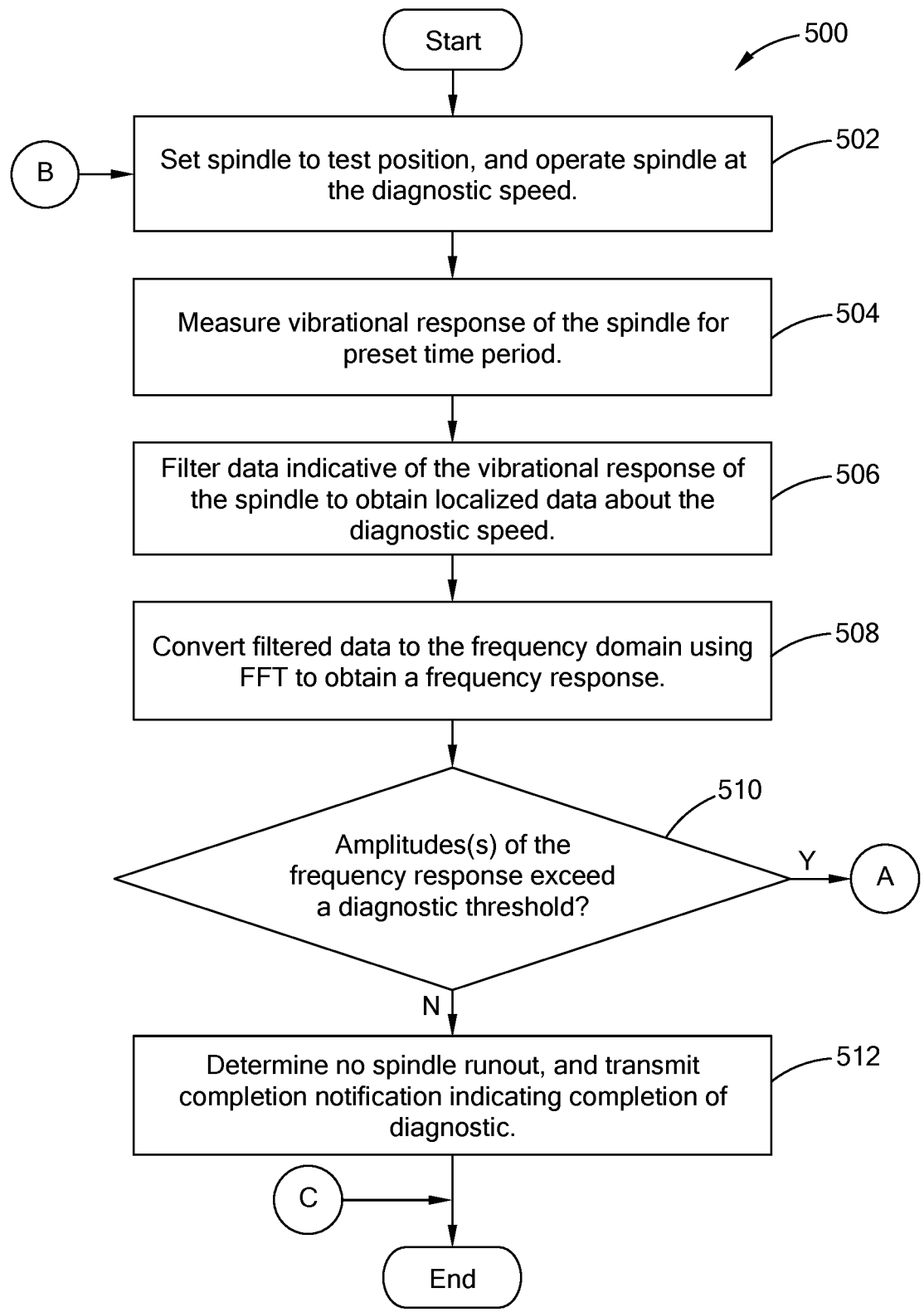
FIGS. 5A and 5B are flowcharts of a spindle runout diagnostic routine in accordance with the teachings of the present disclosure.
Figure 5B:
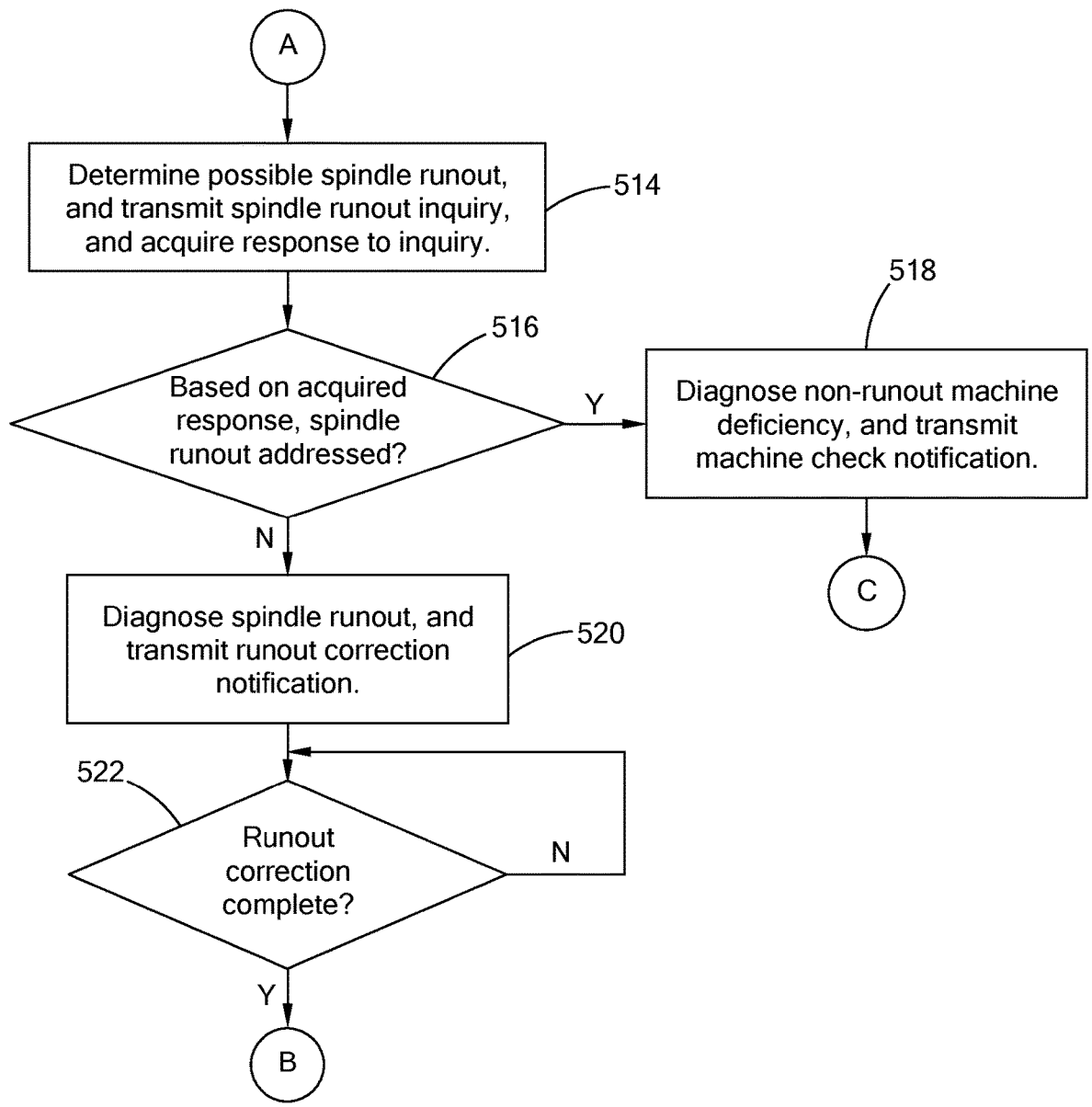

Referring to FIGS. 5A and 5B, an example spindle runout diagnostic routine 500 performed by the machine diagnostic system 200 is provided. The routine may be performed routinely (e.g., every two weeks or month), or when a possible runout condition is suspected.

At 502, the spindle is set to the test position and rotated at the diagnostic speed for a preset time period. In one form, the diagnostic controller is configured to transmit a command to the machine controller to have the machine controller set the position of the spindle and begin rotation. In another form, the diagnostic controller transmits a notification to the user interface to display a message requesting the operator to set the spindle position and operate the spindle at the diagnostic speed.

At 504, with the spindle rotating, the system measures the vibrational response of the spindle for a preset time period by way of the sensor. Once complete, the spindle 108 may be turned off. At 506, the data indicative of the vibrational response is filtered by the system to obtain localized data set about the diagnostic speed. More particularly, in one form, data acquired from the sensor, is filtered using a bandpass filter configured to maintain data about the diagnostic speed. At 508, the system converts the filtered data to a frequency domain using FFT to a frequency response.

At 510, the system determines whether one or more amplitudes of the frequency response exceed a diagnostic threshold. If the amplitudes of the frequency response are below or even equal to the diagnostic threshold, the system determines there is no spindle runout, and transmits a completion notification indicating completion of the diagnostic, at 512. Alternatively, the system may transmit a completion notification indicating no spindle runout but recommending a machine system check for a general health check of the CNC machine.

When one or more amplitudes of the frequency response exceed the diagnostic threshold, at 514, the system determines a possible spindle runout condition, and transmits a spindle runout inquiry to determine if a runout correction was already performed. Based on the input received, the system, at 516, determines whether the spindle runout was previously addressed. If it was, the system, at 518, diagnoses the CNC machine with a non-runout machine deficiency, and transmits a machine check notification. That is, since the spindle runout was already addressed, the cause of the irregular frequency response is unrelated to the spindle alignment, and thus, a general system check of the CNC machine is to be performed. From 520, the routine 500 ends.

If the spindle runout was not previously addressed, the system, at 520, diagnoses the CNC machine with a spindle runout condition, and transmits a runout correction notification recommending a runout correction be performed. At 522, the system determines whether the runout correction is complete. For example, the system receives a completion input from the operator based on a query displayed on the monitor. Once the correction is complete, the system returns to 502 to perform the diagnostic again. That is, the system assesses whether the runout was the cause of the irregular frequency response or whether it is another component of the CNC machine.

The machine diagnostic system of the present disclosure provides an automated system and method for assessing possible spindle runout condition without unnecessary downtime and lengthy testing. In addition, once a runout condition is diagnosed, the system reevaluates the CNC machine to either validate the spindle correction or notify the operator that the cause of the irregularity is not related to misalignment of the spindle.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A diagnostic method for a spindle arm of a machine, the method comprising:
   rotating the spindle arm of the machine at a first rotational speed;
   acquiring, from an accelerometer, data indicative of a vibrational response of the spindle arm operating at the first rotational speed, wherein the accelerometer is disposed along the spindle arm;
   converting, by a diagnostic controller, the vibrational response to a frequency based response to obtain a first frequency response;
   determining, by the diagnostic controller, whether an amplitude of the first frequency response exceeds a diagnostic threshold;
   performing a designated correction on the machine in response to the frequency response exceeding the diagnostic threshold;
   transmitting, by the diagnostic controller, a runout query to assess whether a spindle runout correction was performed;
   acquiring, by the diagnostic controller, a response input to the runout query;
   transmitting, by the diagnostic controller, a runout correction notification to initiate a spindle runout correction as the designated correction in response to the spindle runout correction not being previously performed; and
   transmitting, by the diagnostic controller, a machine check notification as the designated correction in response to the spindle runout correction as being previously performed.

2. The diagnostic method of claim 1 further comprising filtering, by the diagnostic controller, the data indicative of the vibrational response about the first rotational speed prior to converting the vibrational response.

3. The diagnostic method of claim 2, wherein the filtering the data is performed with a bandpass filter.

4. The diagnostic method of claim 1, wherein the vibrational response is converted to a frequency based response using fast Fourier transform.

5. The diagnostic method of claim 1 further comprising orientating the spindle arm at a test position associated with the diagnostic threshold prior to rotating the spindle arm.

6. The diagnostic method of claim 1, wherein in response to the amplitude of the first frequency response exceeding the diagnostic threshold, the method further comprises:
rotating the spindle arm at a second rotational speed different from the first rotational speed;
acquiring, from the accelerometer, data indicative of the vibrational response of the spindle arm operating at the second rotational speed,
converting, by the diagnostic controller, the vibrational response at the second rotational speed to a frequency based response to obtain a second frequency response;
determining, by the diagnostic controller, whether an amplitude of the second frequency response exceeds the diagnostic threshold;
transmitting, by the diagnostic controller, a runout correction notification in response to the amplitude of the second frequency response exceeding the diagnostic threshold; and
transmitting, by the diagnostic controller, a machine check notification, as the designated response, in response to the amplitude of the second frequency response being below the diagnostic threshold.

7. The diagnostic method of claim 1 further comprising:
transmitting, by the diagnostic controller, a runout correction notification in response to the amplitude of the second frequency response exceeding the diagnostic threshold; and
transmitting, by the diagnostic controller, a machine check notification to initiate a system check of the machine as the designated response in response to the amplitude of the frequency based response being below the diagnostic threshold.

8. A diagnostic system for a spindle arm of a machine, the system comprising:
an accelerometer operable to acquire a vibrational response of the spindle arm; and
a diagnostic controller configured to acquire the vibrational response from the accelerometer with the spindle arm rotating at a first rotational speed, and diagnosis the machine based on a fast Fourier analysis of the vibration response acquired, wherein in response to the amplitude exceeding the diagnostic threshold, the diagnostic controller is configured to:
transmit a runout query to determine whether a spindle runout correction was performed,
receive a query response input indicating whether the spindle runout correction was performed,
generate and transmit a runout correction notification to initiate a spindle runout correction in response to the query response input indicating that the spindle runout correction was not previously performed, and
generate and transmit a machine check notification in response to the query response input indicating that the spindle runout correction was previously performed.

9. The diagnostic system of claim 8, wherein the diagnostic controller is configured to filter the data from the accelerometer, convert the filtered data to a frequency based response to obtain a first frequency response using the fast Fourier analysis, and compare an amplitude of the first frequency response with a diagnostic threshold.

10. The diagnostic system of claim 9, wherein the diagnostic controller is configured to diagnose a spindle runout and transmit a runout correction notification in response to the amplitude of the first frequency response exceeding the diagnostic threshold, and to diagnose a system check and transmit a machine check notification in response to the amplitude of the frequency based response being below the diagnostic threshold.

11. The diagnostic system of claim 8, wherein the accelerometer is attachable to and detachable from the spindle arm.

12. The diagnostic system of claim 8, wherein the accelerometer is fixedly attached to the spindle arm.

13. The diagnostic system of claim 8, wherein the diagnostic controller includes a programmable logic machine controller.

14. A diagnostic method comprising:
rotating a spindle arm of a machine at a set speed;
measuring a vibrational response of the spindle arm rotating at the set speed with an accelerometer;
filtering data from the accelerometer about the set speed;
converting the filtered data to a frequency response using fast Fourier transform;
transmitting a service notification regarding the machine based on whether an amplitude of the frequency response exceeds a diagnostic threshold;
transmitting a runout query to assess whether a spindle runout correction was performed in response to the amplitude of the frequency response exceeding the diagnostic threshold;
acquiring information indicative of whether the spindle runout correction was performed;
transmitting a runout correction notification, as the service notification, to initiate a spindle runout correction in response to the spindle runout correction not being previously performed; and
transmitting a machine check notification, as the service notification, in response to the spindle runout correction as being previously performed.

15. The diagnostic method of claim 14, wherein the service notification is a runout correction notification in response to the amplitude of the frequency response exceeding the diagnostic threshold, and is a machine check notification to initiate a system check of the machine in response to the amplitude of the frequency based response being below the diagnostic threshold.

16. The diagnostic method of claim 14, wherein the filtering the data is performed with a bandpass filter.

17. The diagnostic method of claim 14 further comprising orientating the spindle arm at a test position associated with the diagnostic threshold prior to rotating the spindle arm.

* * * * *